Figure 1:
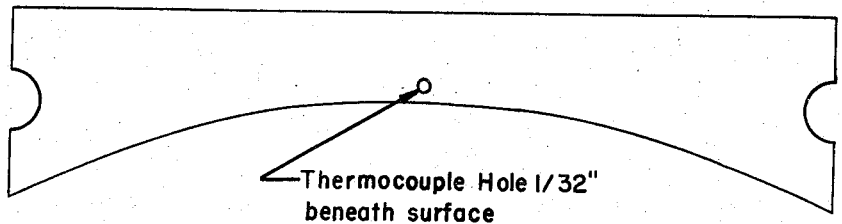

March 3, 1959  F. C. WAGNER  2,875,510
BEARING COMPOSITION
Filed May 18, 1956

Thermocouple Hole 1/32" beneath surface

INVENTOR.
Frank C. Wagner

United States Patent Office 2,875,510
Patented Mar. 3, 1959

2,875,510

BEARING COMPOSITION

Frank C. Wagner, Solon, Ohio, assignor to Horizons Incorporated, Princeton, N. J., a corporation of New Jersey Application May 18, 1956, Serial No. 585,859

4 Claims. (Cl. 29—182.5)

This invention relates to a novel composition suitable for bearings and for cage materials for bearing races. More particularly, it relates to a composition of matter containing a softer phase such as silver or a silver base alloy distributed in a preferred manner throughout a harder phase, a matrix comprising a metallic boride-nickel composite material.

Present-day premium bearing materials invariably are formed of at least two components; a soft lubricating constituent and a harder load-carrying constituent. Three general arrangements of those have been evolved. The oldest arrangement is to dispose a hard phase throughout a softer phase as in a conventional babbit. More recently it has been the practice to dispose the softer phase in the form of a thin layer on at least one surface of a harder phase. A third arrangement is the reverse of the first and embodies dispersions of a softer material in a relatively hard matrix. This invention is directed principally to a material in which the two phases are disposed in the latter fashion because it appears to offer the best combination of properties. Such two phase combinations, it has been shown, produce a friction coefficient which is much lower than the coefficient of friction of most single phase or homogeneous materials and, as a consequence, under severe conditions of service the rate at which heat is evolved and the actual temperature rise of the materials involved is greatly reduced as compared with other materials. The modern theory, simply expressed, is that the hard phase tends to keep the local true contact areas small. A thin film of the soft material smeared over each of these areas acts as a lubricant with resultant low local shear strength. The total friction force which is the product of the small true contact area multiplied by the low shear strength is correspondingly low.

Many materials have been employed for the softer phase. Tin, lead, cadmium and their alloys, particularly with bismuth and with one another, are representative of the prior art materials. Such materials have been found to operate satisfactorily but obviously are limited to use at temperatures well below their melting points to avoid their loss from the bearing by melting and flowing away. At service temperatures such as those for which the present bearing material is intended, the prior art white metals are useless.

Obviously, then, the softer phase must be selected from materials having a melting point above the anticipated operating temperature. Advantageously, the softer constituent should also possess sufficient plasticity over a wide range of temperatures below the melting point to enable it to smear over the harder phase. Furthermore, the softer material should be comparatively inert with respect to the environment in which it is to be operated. Thus, it should not alloy with or weld to the material forming the surface against which it bears, nor should it react readily with the atmosphere in which it is to be used. Pure silver possesses many of the properties necessary to meet the above service requirements, particularly when the composition is to be used in contact with a steel surface at somewhat elevated temperatures. Certain elements may be added to the softer silver phase in minor, but nonetheless significant amounts, to enhance the over-all performance of the bearing material, or to facilitate the manufacturing process, particularly the infiltration step. Accordingly, the term "silver," as employed hereinafter in this specification, is intended to cover both elemental silver and alloys in which silver is the major constituent.

It has already been proposed in U. S. Patent 1,913,373 to form composite bodies comprising relatively hard crystalline boride material and a bonding agent. Such compositions are indicated in the patent as suitable for tools for cutting, abrading, or in wear resistant applications. The bonding materials disclosed by the patentee are one or more of a number of metals, rubber, shellac and other organic compounds. In attempting to adapt such compositions for bearing applications in equipment which presently operates at relatively elevated temperatures, e. g. under service temperatures of several hundred degrees Fahrenheit, I have found that for my purpose the combinations proposed are entirely inadequate.

I have discovered that once a metal-bonded boride article has been formed the desired combination of properties, namely: the desired combination of low friction, high strength and freedom from galling when in contact with steel surfaces at elevated temperatures, is obtained only after the metal-bonded boride article has been impregnated with a softer lubricant phase, and preferably after it has been impregnated with silver or a silver alloy, in an amount sufficient to bring the density up to 100%, that is, to completely fill the voids in the sintered matrix.

In accordance with my invention I first prepare an intimate mixture of finely divided suitable metallic boride and nickel also in finely divided form. The matrix is then shaped into the form of a blank, at a pressure of between ten and twenty tons per square inch. The compact so formed is then sintered in a suitable atmosphere, such as hydrogen, at a temperature between about 1000° C. and 1100° C. depending on the specific constituent materials. After sintering, the compact is infiltrated to 100% density with silver or a silver alloy to produce the novel material constituting the subject of my invention.

The exact effect of the silver is not known, but as previously indicated, it constitutes the softer phase in a duplex structure, and because of its initial resistance to oxidation and to attack by many corrosive atmospheres, its presence distributed throughout the hard matrix permits the material to be run in service at temperatures considerably higher than those at which present day materials will perform satisfactorily.

Figure 2:
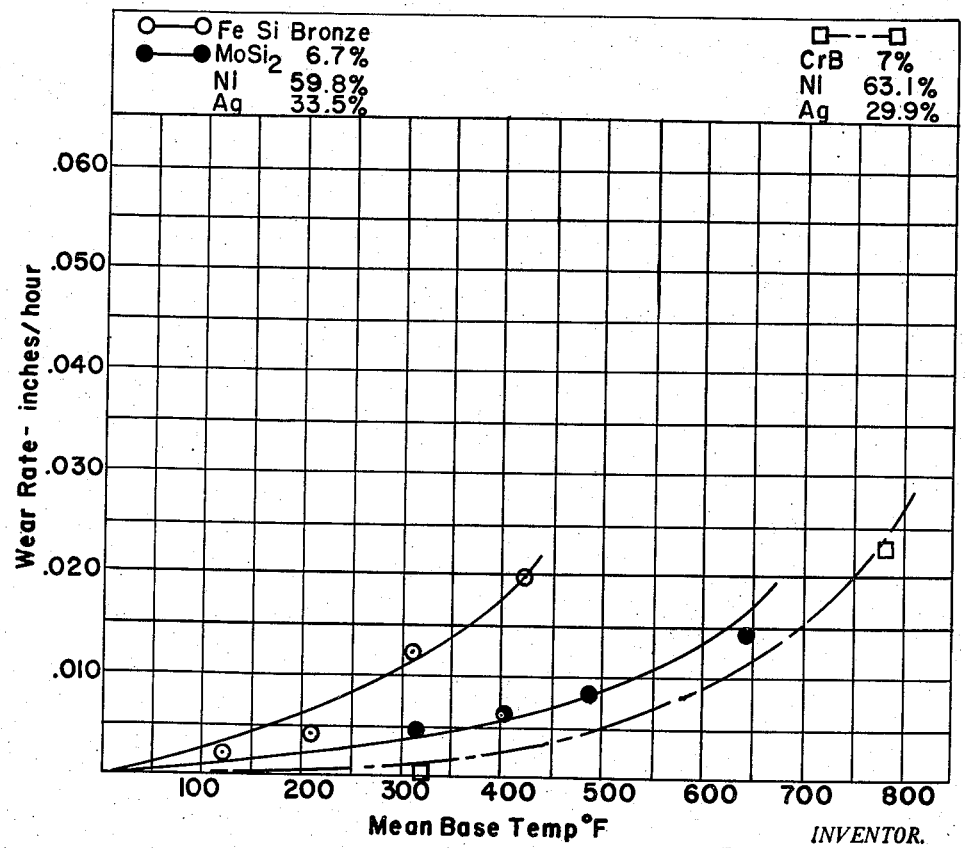

In the attached drawing,

Fig. 1 represents the configuration of the test piece used to obtain comparative performance data of various compositions, and Fig. 2 represents a comparison of the wear characteristics of three typical compositions.

The following examples will serve to further illustrate the preparation and testing of compositions which are merely exemplary and not limitative of my invention.

EXAMPLE

Nickel powder (—100 mesh, Tyler Standard) was mixed with 7% by weight of chromium boride (CrB) and cold pressed at about 14 tons per square inch into the form of a compact 4 inches by 1 inch by ½ inch. The compact was placed in a porcelain boat and was sintered at 1000° C. in a hydrogen atmosphere for 60 minutes, and then cooled to room temperature in hydrogen. The resulting porous skeleton was placed in contact with silver sheet in a porcelain boat, the amount of silver being slightly more than that required to provide 100% density in the infiltrated compact. The boat was heated in hydrogen to just above the melting point of silver, held for about 10 minutes, and then furnace cooled. The infiltrated bar was then machined to the shape shown in Fig. 1 and tested in sliding wear by being pressed with a force of 10 pounds against a high speed rotating disk of hardened steel at surface speeds of 400 feet per second and bulk specimen temperatures up to 600° F. under uniform lubrication conditions.

For purposes of comparison, similar specimens were tested to determine the wear rate, freedom from vibration and scoring of the hardened steel disc.

Fig. 2 shows the results of one such test, in which wear rates of three such compositions are plotted against the operating temperature, measured by means of a thermocouple placed in the opening shown in Figure 1.

Table I

Composition A Iron silicon bronze [1]
Composition B 33.5% Ag 59.8% Ni 6.7% $MoSi_2$
Composition C 29.9% Ag 63.1% Ni 7% CrB

[1] Nominal composition 2.5–4% Si; 1–2% Fe; 1.5–4% Zn; 1% Max Mn; 1% Max Pb; 1% Max P. bal. Cu.

Composition C is the composition prepared in the above example. Composition A is a conventional iron-silicon bronze, commonly used in present day bearings. Composition B is representative of the compositions disclosed and claimed in a copending application, which issued on August 6, 1957, as United States Patent 2,801,462, namely Serial No. 484,300 of which I am a joint inventor, and was prepared by the method of the above examples except that 6.7% by weight of molybdenum disilicide was substituted for the 7% by weight of chromium boride, and a slightly greater amount of silver infiltrated the sintered compact.

It will be noted that compositions formulated with nickel, chromium boride and silver, could be operated at considerably higher temperatures than either of the other compositions. For example, the boride containing specimen could be operated at temperatures almost twice as great as the silicon-bronze of the prior art before a wear rate of 0.010 inch per hour was reached. Stated another way, at a 400° F. operating temperature, the wear rate of the boride composition was about half that of the silicide and only one-seventh that of the silicon bronze specimen.

Other properties of the improved bearing material were tested as follows:

(1) The dimensional stability of composition C was checked by heating each of two machined specimens to 1000° F. and then quenching one in oil and letting the other air cool. This procedure was repeated twenty times for each specimen and then the dimensions of the test pieces were rechecked. No dimensional changes or specimen warpage could be found at the end of this 20 cycle interval. The surface also showed no evidence of oxidation during this period.

(2) The tensile properties of two silver impregnated-nickel-chromium boride materials were determined and were found to be:

|  | Material C | Material D [1] |
|---|---|---|
| Tensile_____p. s. i._ | 28,000 | 37,000 |
| Elongation_____percent_ | 4.6 | 12 |
| Reduction in area_____do____ | 2.2 | 5.8 |

[1] D 3.5% CrB; 66.7% Ni; 29.8% Ag.

(3) The impact resistance was measured at room temperature using standard Charpy notched test bars. Two specimens corresponding to composition "C" were tested. One had a value of 4 ft.-lbs. and the other 3.6 ft.-lbs. A similar test was conducted on identical specimens which had been heated in oil to 350° F. and the values for these specimens were 4.5 ft.-lbs. and 3.8 ft.-lbs.

Two other silver infiltrated Ni-CrB specimens were checked for impact ratings. One bar was prepared in a manner similar to that explained previously with the exception that it was cold rolled and reduced 5% before infiltration. The impact strength of this bar was 4.5 ft.-lbs. The other specimen (D) had only 3.5% CrB but was sintered and infiltrated in the usual manner. The impact strength of this bar, which was only roughly cut and notched to shape, was 29 ft.-lbs. or about six times the strength of the 7% CrB specimens.

In addition to the above disclosed chromium boride containing composition, other samples were prepared with between 3% and 20% by weight of the borides of manganese, titanium, molybdenum, and tungsten. In every instance the resulting compositions ran better than the prior art silicon-bronze, and better than compositions in which carbides or silicides were present instead of the boride. The following table indicates some of the compositions tested.

Table II

[Composition, weight percent.]

| Percent Ni | Percent Ag | Percent Other | Temperatures (° F.) | Results | |
|---|---|---|---|---|---|
|  |  |  |  | Vibration | Scoring |
| 47.5 | 50 | 2.5 SiC | 500 | Severe____ | Yes. |
| 59.4 | 34 | 6.6 TiC | 490 | Moderate_ | Yes. |
| 57.4 | 36.2 | 6.4 CbC | 500 | Severe____ | Yes. |
| 59.1 | 34.3 | 6.6 VC | 400 | Moderate_ | N.R.[1] |
| 52.6 | 41.6 | 5.8 $ZrSi_2$ | 500 | Severe____ | Yes. |
| 54.1 | 32.4 | 13.5 $MoSi_2$ | 300 | None_____ | None. |
| 54.1 | 32.4 | 13.5 $MoSi_2$ | 780 | Very Severe. | Yes. |
| 59.8 | 33.5 (Ag-Cd.) | 6.7 $MoSi_2$ | 300 | None_____ | None. |
| 59.8 | 33.5 | 6.7 $MoSi_2$ | 780 | Very Severe. | Yes. |
| 46.1 | 48.5 | 5.4 $TiSi_2$ | 425 | Moderate_ | N.R.[1] |
| 63.1 | 29.9 | 7.0 CrB | 780 | None_____ | Slight. |
| 63.1 | 29.9 | 7.0 CrB | 300 | None_____ | None. |
| 66.7 | 29.8 | 3.5 CrB | 600 | Slight____ | None. |
| 59.1 | 34.3 | 6.6 MnB | 265 | None_____ | None. |
| 54.7 | 43.5 | 2.8 $Ca_5B$ | 500 | Severe____ | N.R.[1] |
| 57.2 | 36.4 | 6.4 MoB | 580 | None_____ | None. |
| 58.6 | 34.9 | 6.5 TiB | 405 | Severe____ | None. |

[1] N.R. Not reported.

From the above and other tests, I have found that compositions prepared in the manner described and containing between about 15% by weight and 35% by weight silver, between about 3% by weight and 20% by weight of a suitable boride, and the balance (between about 45% by weight and about 82% by weight) nickel, performed satisfactorily at temperatures exceeding those at which silicon bronze and other common bearing materials failed, when bearing against a hardened steel rotating member. Preferably the boride should be selected from the group consisting of manganese and the metals of group VI A, namely: chromium, molybdenum, tungsten and manganese.

A more preferred composition comprises about 28% to 32% by weight of silver, 55–65% by weight of nickel and between 3 and 10% by weight of a suitable boride, preferably chromium boride. Specifically, optimum properties have been obtained with compositions comprising about 7% chromium boride, about 30% silver and about 63% by weight nickel. While I have disclosed sintering and infiltration as separate steps, it will be obvious to those skilled in the powder metallurgy art that infiltration may be effected during the sintering step.

Having disclosed my invention with the particularity required by statute, what I desire to claim as new and useful is the following:

1. A composition of matter consisting essentially of between about 45 and 82% nickel, 15 and 35% silver, and the balance substantially all a boride from the group consisting of the borides of manganese, chromium, molybdenum and tungsten.

2. The composition of claim 1 in which the boride is chromium boride.

3. An improved bearing material consisting of a hard matrix of nickel and a boride of the group consisting of manganese, chromium, molybdenum and tungsten, infiltrated to about 100% of theoretical density with silver to produce a material consisting of between 28% and 32% by weight of silver, 55% and 65% by weight of nickel and between 3% and 10% by weight of said boride.

4. A composition of matter comprising about 7% chromium boride, 63% nickel and 30% silver.

References Cited in the file of this patent

UNITED STATES PATENTS

| 1,913,373 | de Golyer | June 13, 1933 |

FOREIGN PATENTS

| 501,069 | Canada | Mar. 30, 1954 |

OTHER REFERENCES

Goetzel: "Treatise on Powder Metallurgy," vol. I, p. 31, 1949; vol. II p. 481; 1950, Interscience Publ., Inc., N. Y.